United States Patent [19]

Stoutenburg

[11] Patent Number: 4,768,690

[45] Date of Patent: Sep. 6, 1988

[54] SLOW MOVING VEHICLE WARNING APPARATUS, AND METHODS OF CONSTRUCTING AND UTILIZING SAME

[76] Inventor: H. Albert Stoutenburg, Stoutenburg Farms, 275 S. Banner Rd., Sandusky, Mich. 48471

[21] Appl. No.: 4,124

[22] Filed: Jan. 16, 1987

[51] Int. Cl.[4] .............................................. B60R 9/00
[52] U.S. Cl. ............................ 224/273; 224/42.45 R; 116/173
[58] Field of Search ............... 224/251, 273, 42.45 R, 224/915, 30 R, 39, 42.42; 116/35 R, 173; 248/539; 280/762, 769

[56] References Cited

U.S. PATENT DOCUMENTS

| | | | |
|---|---|---|---|
| 2,398,748 | 4/1946 | Lange et al. | 224/273 X |
| 3,007,618 | 11/1961 | Davis et al. | 224/42.45 R |
| 3,167,284 | 1/1965 | Lynch | 224/30 R X |
| 3,599,599 | 8/1971 | Jones | 116/173 |
| 3,722,841 | 3/1973 | Ciolfi | 224/39 X |
| 4,002,138 | 1/1977 | Dobala | 116/173 X |
| 4,378,888 | 4/1983 | Reed | 224/273 X |
| 4,590,883 | 5/1986 | Steed et al. | 116/173 |
| 4,633,215 | 12/1986 | Anders et al. | 116/173 X |
| 4,662,305 | 5/1987 | Cline | 116/173 |

FOREIGN PATENT DOCUMENTS 735052  8/1955  United Kingdom ................ 224/39

*Primary Examiner*—Henry J. Recla
*Assistant Examiner*—Robert Petrik
*Attorney, Agent, or Firm*—Irving M. Weiner; Joseph P. Carrier; Pamela S. Burt

[57] ABSTRACT

A slow moving vehicle warning apparatus having a warning flag, a warning flag bracket for removably receiving the warning flag, and a warning flag storage tube for storing the warning flag when not in use. The bracket and tube are attached to the slow moving vehicle or trailer, to provide convenient and easy access of the flag by the operator for use or storage.

8 Claims, 1 Drawing Sheet

SLOW MOVING VEHICLE WARNING APPARATUS, AND METHODS OF CONSTRUCTING AND UTILIZING SAME

BACKGROUND OF THE INVENTION

1. Field of the Invention

The present invention relates generally to a slow moving vehicle warning apparatus, and methods of constructing and utilizing the same. More particularly, the present invention relates to a complete slow moving vehicle warning apparatus including a warning flag, a flag bracket, and a storage tube for storing the warning flag when not in use.

2. Description of the Relevant Art

The relevant art is exemplified by: Winsick U.S. Pat. No. 2,332,286 entitled "FLAG HOLDER FOR AUTOMOBILES"; Winsick U.S. Pat. No. 2,358,120 entitled "FLAG HOLDER FOR AUTOMOBILES"; Olson U.S. Pat. No. 2,775,221 entitled "FLAG DISPLAY MEANS"; Lynch U.S. Pat. No. 3,167,284 entitled "FISHING ROD CARRIER FOR A BICYCLE"; and Ciolfi U.S. Pat. No. 3,722,841 entitled "FLAG HOLDER".

The present invention includes features which are not taught or suggested by the relevant art. These features provide an inexpensively manufactured warning apparatus specifically designed for use on slow moving vehicles or slow moving trailers. Furthermore, the present invention discloses not only flag and bracket portions, but also a convenient storage portion for holding the flag when not in use.

The prior art does not specifically disclose such an apparatus for use on slow moving vehicles or trailers. There is known in the art reflective devices having the general shape of a triangle which are mounted on such vehicles. However, these slow moving vehicle indicators fail to offer adequate warning. Accordingly, the known art fails to disclose an effective warning system for slow moving vehicles or trailers when present on roadways or highways.

SUMMARY OF THE INVENTION

The present invention provides a slow moving vehicle warning apparatus for use on or in conjunction with slow moving vehicles or slow moving trailers. The apparatus comprises three basic portions including a warning flag for visibly signaling traffic that a slow moving vehicle or trailer is present, a bracket for attachment to the slow moving vehicle or trailer, and a warning flag storage device also attached to a slow moving vehicle or trailer for holding and conveniently storing the warning flag when not in use.

An object of the present invention is to provide a slow moving vehicle warning apparatus which is inexpensive to construct.

Another object of the invention is to provide such an apparatus which is a complete slow moving vehicle warning system.

Yet another object of the invention is to provide such an apparatus which mounts easily to a slow moving vehicle or trailer.

A further object of the present invention is to provide a slow moving vehicle warning apparatus which is easily fitted to any slow moving vehicle or slow moving trailer.

Another object of the present invention is to provide such an apparatus which is durable and weather resistant.

Still another object of the present invention is to provide a means by which a warning flag may be easily mounted to and conveniently stored on a slow moving vehicle or trailer.

For the accomplishment of these and related objects which shall become apparent as the description proceeds, the present invention resides in the construction, combination and arrangement of parts as shall be hereinafter more fully described, illustrated in the accompanying drawings, and pointed out in the appended claims.

DETAILED DESCRIPTION OF THE PREFERRED EMBODIMENT

Figure 1:
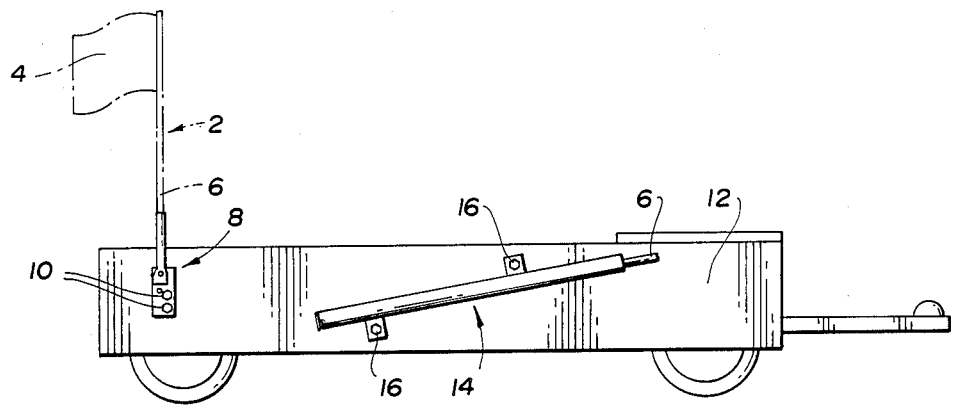
FIG. 1 illustrates a side elevational view of a slow moving vehicle warning apparatus having the elements of the apparatus fitted in the relative positions as affixed to a slow moving vehicle or trailer in accordance with a preferred embodiment of this invention.

FIG. 1 illustrates a preferred embodiment of the present invention as adapted to a slow moving vehicle or trailer. As shown, there is a slow moving trailer 12 which reveals the relative positions of the elements of the present invention. While a slow moving trailer 12 is indicated, it is understood that the present invention may be fitted to any road-going apparatus which moves, or may move, slowly, thereby causing potential danger to surrounding traffic.

A warning flag means, generally indicated by 2, is provided for alerting surrounding traffic that a slow moving vehicle is present. The flag means 2 is comprised of pole 6 and flag piece 4, although a plurality of pieces may be used.

Aesthetic and functional features of flag piece 4 may include, but not exclusively, bright, highly visible colors and/or designs.

Flag means 2 is slidingly mounted into a warning flag bracket means, generally indicated by 8, which is fitted to slow moving trailer 12 at a point and in such a manner that flag means 2 may be readily observed. As shown, bracket means 8 is mounted to a side of slow moving trailer 12, but may be mounted in the rear or front, or may be alternatively mounted on the frame, etc., of trailer 12, or may be mounted on the cab, etc., of a slow moving vehicle.

Figure 4:
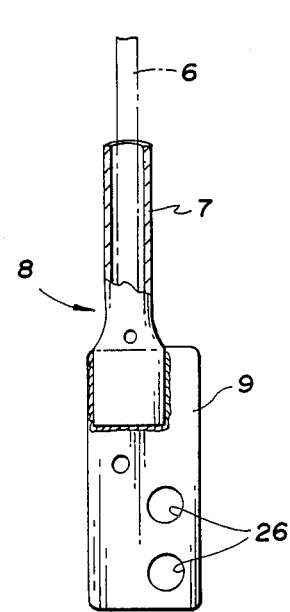
FIG. 4 illustrates a front view of the flag holding bracket according to this invention in partial cross-section.
Figure 5:
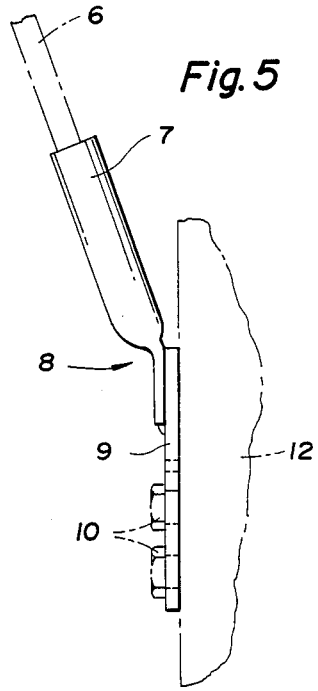
FIG. 5 is a side elevational view of the flag holding bracket depicted in FIG. 4 as fitted to a slow moving vehicle or trailer.

As detailed in FIG. 4, bracket means 8 is preferably, but not exclusively, comprised of hollow tube portion 7 for receiving pole 6 and supporting plate 9. Attachment holes 26 provide for fixedly attaching bracket means 8 to slow moving trailer 12. Conventional fasteners 10 as shown in FIG. 5 may be used for fixing bracket means 8 to slow moving trailer 12. As an alternative, attachment may be accomplished by means of welding.

Referring to FIG. 1, there is also shown a warning flag storage means generally indicated by 14. A portion of pole 6 is seen projecting from storage means 14 thereby allowing convenient grasping of the flag means 2 by the operator.

Figure 2:
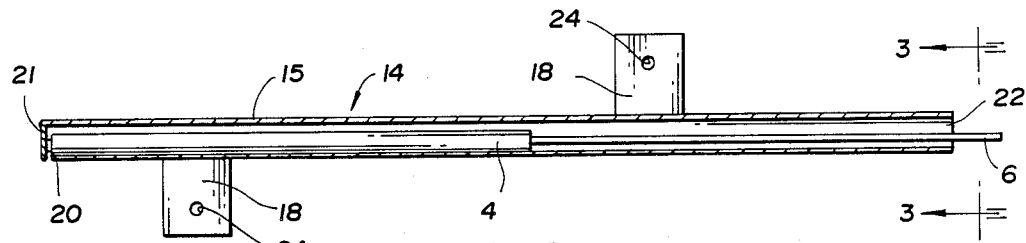
FIG. 2 illustrates a cross-section of the flag storage tube according to this invention revealing a rolled up warning flag stored therein.

FIG. 2 discloses the detailed elements of storage means 14. There is shown a cross-sectioned warning flag storage means 14 with flag means 2 stored therein. Preferably, but not necessarily, storage means 14 is comprised of elongated tube 15 having open end 22 for receiving flag 2 and attachment brackets 18, each provided with attachment holes 24. At the end of tube 15 opposite open end 22 is closed end 21, having provided therein drainage slot 20 which allows fluids and foreign bodies to escape.

Figure 3:
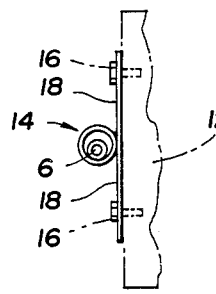
FIG. 3 is a side elevational view of the flag storage tube depicted in FIG. 2 as attached to a slow moving vehicle viewed from its flag receiving opening and showing a rolled-up flag as stored.

As shown in FIG. 3, storage means 14 is fitted to slow moving trailer 12 by means of a plurality of conventional fastener 16. As an alternative, attachment may be accomplished by means of welding.

When not in use, flag piece 4 of warning flag means 2 is wrapped about pole 6, and the wrapped flag is placed slidingly into storage means 14. When the operator anticipates that he will conduct his slow moving vehicle or trailer onto the roadway or highway, he removes flag means 2 from storage means 14 and slidingly fits pole 6 into hollow tube portion 7 of bracket means 8. After leaving the roadway or highway, the operator removes flag means 2 from bracket means 8, rewraps flag piece 4, and reinserts flag means 2 into storage means 14.

While the present invention has been illustrated and described in connection with a preferred embodiment, it is not to be limited to the particular structure shown, because many variations thereof will be evident to one skilled in the art and are intended to be encompassed in the present invention set forth in the following claims.

I claim:

1. A slow moving vehicle warning apparatus, comprising:
   warning flag means for visually signalling traffic that a slow moving vehicle or trailer is present, said warning flag means comprises a pole fitted with a flag piece at an upper end portion thereof;
   warning flag bracket means adapted to be substantially permanently and non-movably affixed to a first substantially flat surface portion of said slow moving vehicle or trailer and adapted to removably support said warning flag means in a displayed position thereof, said warning flag bracket means comprises a hollow tube integrally attached to a substantially flat supporting plate; and
   warning flag storage means adapted to be substantially permanently and non-movably affixed to a second substantially flat surface portion of said slow moving vehicle or trailer and adapted to receive and store said warning flag means when said warning flag means is removed from said bracket means, said warning flag storage means comprises an elongated tubular member having an open end for receiving said warning flag means in a storage position thereof and an opposite, closed end with a drainage slot defined therein;
   said pole of said warning flag means including a lower end portion adapted to be closely slidably received in said hollow tube of said bracket means; and
   said hollow tube of said warning flag bracket means is attached to said substantially flat supporting plate such that said hollow tube defines an obtuse angle with said supporting plate and so that said flag means will project away from said trailer when the flag is in said displayed position.

2. A slow moving vehicle warning apparatus according to claim 1, wherein:
   the elongated tubular member of said warning flag storage means has a plurality of attachment brackets integrally affixed thereto; and
   said tubular member being dimensioned so as to accommodate said warning flag means therein such than an end portion of said pole extends outwardly from said tubular member when an opposite end portion of said pole is disposed within said tubular member adjacent said closed end thereof.

3. A slow moving vehicle warning flag storage device according to claim 2, wherein:
   said flat supporting plate of said warning flag bracket means is provided with a plurality of apertures; and
   said supporting plate is adapted to be substantially permanently affixed to said first substantially flat surface portion of said slow moving vehicle or trailer by conventional fasteners received through said apertures.

4. A slow moving vehicle warning flag storage device according to claim 2, wherein:
   both said first flat surface portion and said second substantially flat surface portion of said slow moving vehicle or trailer comprise exterior vehicle surface portions.

5. A slow moving vehicle warning flag storage device according to claim 4, wherein:
   said elongated tubular member is affixed to said second surface portion of said slow moving vehicle or trailer in an angular disposition such that said closed end thereof is disposed at a lower level than said open end thereof; and
   said drainage slot is arranged to be positioned away from said second surface portion of said slow moving vehicle or trailer to permit water to drain therethrough directly to a ground surface.

6. A slow moving vehicle warning flag storage device according to claim 5, wherein:
   said first and second flat surface portions of said slow moving vehicle or trailer comprise spaced apart exterior vehicle surface portions located on a continuous flat side surface of said slow moving vehicle or trailer.

7. A slow moving vehicle warning flag storage device according to claim 6, wherein:
   said first surface portion is disposed adjacent a rear end of said flat side surface of said slow moving vehicle or trailer; and
   said second surface portion is disposed forwardly of said first surface portion.

8. A slow moving vehicle warning flag storage device according to claim 7, wherein:
   said flag piece is fabricated of a brightly colored, highly visible material; and
   said warning flag bracket means is fabricated of a plastic material.

* * * * *

UNITED STATES PATENT AND TRADEMARK OFFICE
CERTIFICATE OF CORRECTION

PATENT NO. : 4,768,690

DATED : September 6, 1988

INVENTOR(S) : STOUTENBURG

It is certified that error appears in the above-identified patent and that said Letters Patent is hereby corrected as shown below:

Column 3, line 21, change "fastener" to --fasteners--;
          line 39, after "invention" insert --as--.
Column 4, line 16 (claim 2, line 8), change "than" to --that--;
          line 48 (claim 6, line 2), change "5" to --4--.

Signed and Sealed this

Twenty-eighth Day of February, 1989

Attest:

DONALD J. QUIGG

*Attesting Officer*       *Commissioner of Patents and Trademarks*